United States Patent [19]

Farrow

[11] 4,259,648
[45] Mar. 31, 1981

[54] ONE-BIT FREQUENCY-SHIFT-KEYED MODULATOR

[75] Inventor: Cecil W. Farrow, Highlands, N.J.

[73] Assignee: Bell Telephone Laboratories, Incorporated, Murray Hill, N.J.

[21] Appl. No.: 56,531

[22] Filed: Jul. 11, 1979

[51] Int. Cl.³ .............................................. H04I 27/12
[52] U.S. Cl. ................................ 332/9 R; 332/11 R; 332/16 R; 375/62
[58] Field of Search ................ 332/16 R, 24, 9 R, 14, 332/11 R; 375/62, 64, 65; 328/63

[56] References Cited

U.S. PATENT DOCUMENTS

| 3,697,892 | 10/1972 | Lawrence et al. | 332/9 R |
| 3,773,975 | 11/1973 | Koziol | 375/62 |
| 3,824,498 | 7/1974 | McBride | 375/62 |
| 4,077,021 | 2/1978 | Csajka et al. | 332/16 R |

Primary Examiner—David K. Moore

Attorney, Agent, or Firm—John Francis Moran

[57] ABSTRACT

A shift-keyed modulator utilizes a lookup table (41) to provide a binary sequence of digits one at a time. Since the binary digits are selected so that their accumulation represents the amplitudes of a series of points on a theoretical sinusoidal wave, a low-pass filter (51) acting as an integrator is able to provide a sinusoidal wave signal. Furthermore, the low-pass filter includes gates that operate in push-pull fashion to form a balanced configuration for cancelling even ordered harmonic distortion. The modulator has a rate multiplier (11) responsive to space/mark signaling for controlling the rate the the binary digits are produced by the lookup table. A second group of binary digits is stored in the lookup table and is read out concurrently with the first sequence. Alternate pairs of gates (52 and 53 or 54 and 55) are enabled in the low-pass filter to provide binary data signals for either of the frequency bands used in duplex data signaling circuits.

6 Claims, 4 Drawing Figures

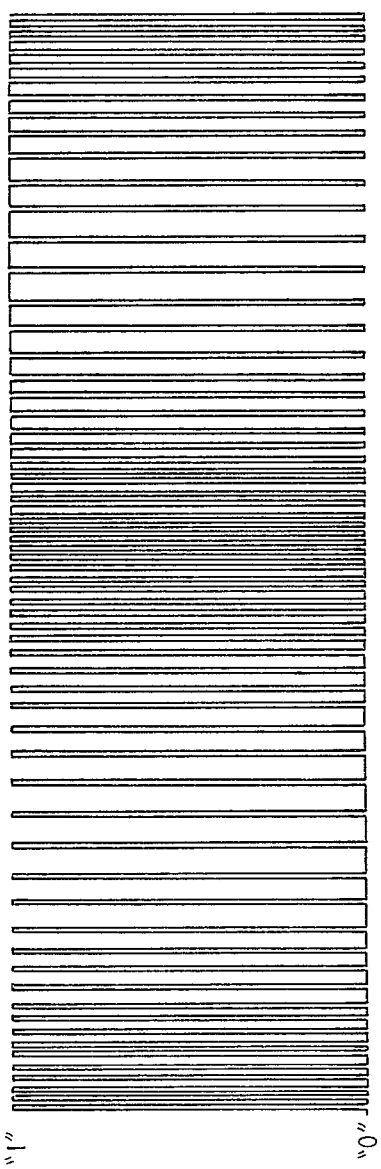
FIG. 2
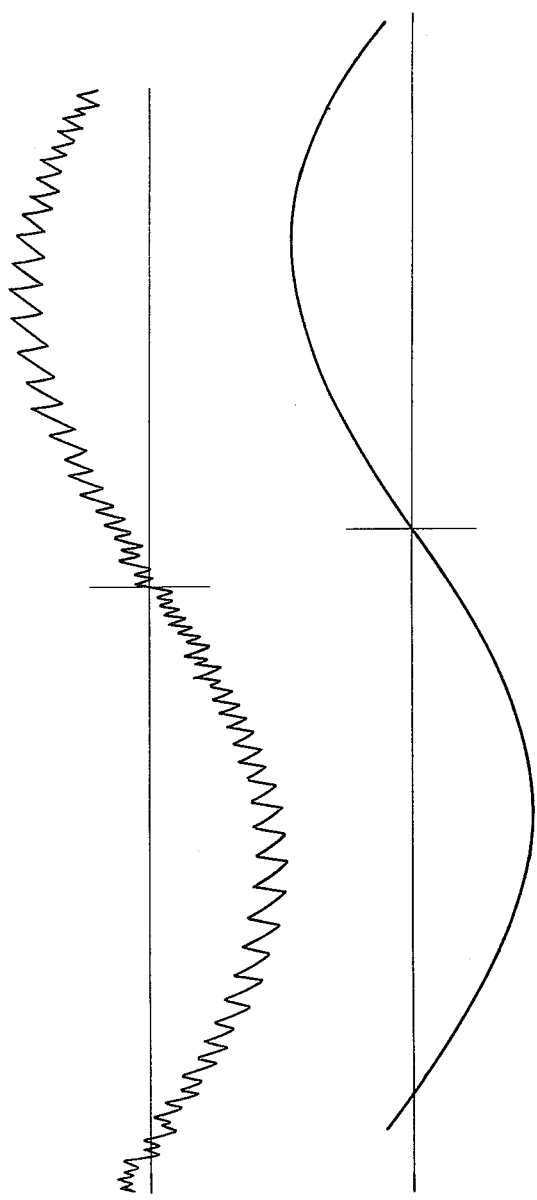
FIG. 3
FIG. 4

ONE-BIT FREQUENCY-SHIFT-KEYED MODULATOR

BACKGROUND OF THE INVENTION

This invention relates to data communication systems and, more particularly, to digital frequency-shift-keyed modulators for providing sinusoidal wave output signals of different frequency indicative of the occurrence of marks and spaces in a data signal.

The impact of computer proliferation and distributed intelligent systems has increased the amount and availability of information or data to be processed, stored, and transmitted. A convenient technique for transmitting data involves modulators for converting data signals into voice frequency tones for transmission over ordinary telephone lines. Numerous frequency-shift-keyed modulators of both the analog and digital variety have been devised by those skilled in the art as one means of implementing this technique.

Since the anticipated demand of such modulators will increase with time, it would be highly desirable to have designs compatible with the new large scale integration logic technologies in terms of fabrication and powering requirements. In addition, such a modulator should also be relatively inexpensive to manufacture as well as meeting the signaling requirements for suppression of out-of-band tones (e.g., harmonics). Furthermore, such a modulator should provide a smooth transition, called quasi-continuous, when shifting from a mark frequency to a space frequency tone and vice versa.

It is an object of the present invention to provide a relatively inexpensive and simple frequency-shift-keyed modulator and, in particular, for accomplishing these aims, to provide a frequency-shift-keyed modulator which is principally digital in construction and function.

A related object of the invention is to provide a frequency-shift-keyed modulator which produces a sinusoidal output signal by directly low-pass filtering a sequence of binary digits and therefore obviates the digital-to-analog converter employed in conventional frequency-shift-keyed modulators.

A further object of the invention is to provide a balanced loss-pass filtering arrangement for inherently and conveniently eliminating even ordered harmonic frequency components by cancellation or destructive interference.

SUMMARY OF THE INVENTION

The invention takes the form of a lookup table for storing binary digits capable of being obtained in a sequence for driving a balanced buffer coupled to an output transformer through a balanced low-pass filter. An accumulation of the binary digits represents the amplitudes of a series of points on a theoretical sinusoidal wave to enable the low-pass filter which functions as an integrator to provide a sinusoidal wave directly from the binary digit sequence thereby obviating a digital-to-analog converter. The balanced configuration of the low-pass filter also serves to eliminate even ordered harmonic frequency components even though it is operated nonlinearly.

In some of the further aspects of the invention, a register is disposed between the lookup table and the balanced buffer, so that the output of the table is strobed after its output is stabilized. The low-pass filter comprises dual tapped load resistors whose taps are capacitively bridged between the resistors to form a ladder network. Furthermore, two binary digit sequences are produced by the lookup table to provide two frequency bands, one for each direction of transmission in duplex system. The bit sequence is obtained from the lookup table at different rates by a counter/rate multiplier responsive to a mark/space input data signal.

BRIEF DESCRIPTION OF THE DRAWING

These and other objects and features of the invention will be more readily appreciated and better understood by reference to the following detailed description which should be considered in combination with the accompanying drawing.

FIG. 2 illustrates the high-band binary digit sequence provided by the lookup table of FIG. 1.

FIG. 3 represents the response of one section of low-pass filtering to the bit sequence of FIG. 2.

FIG. 4 illustrates the smooth sinusoidal wave output of the filter produced by the bit sequence of FIG. 2.

DETAILED DESCRIPTION

Figure 1:
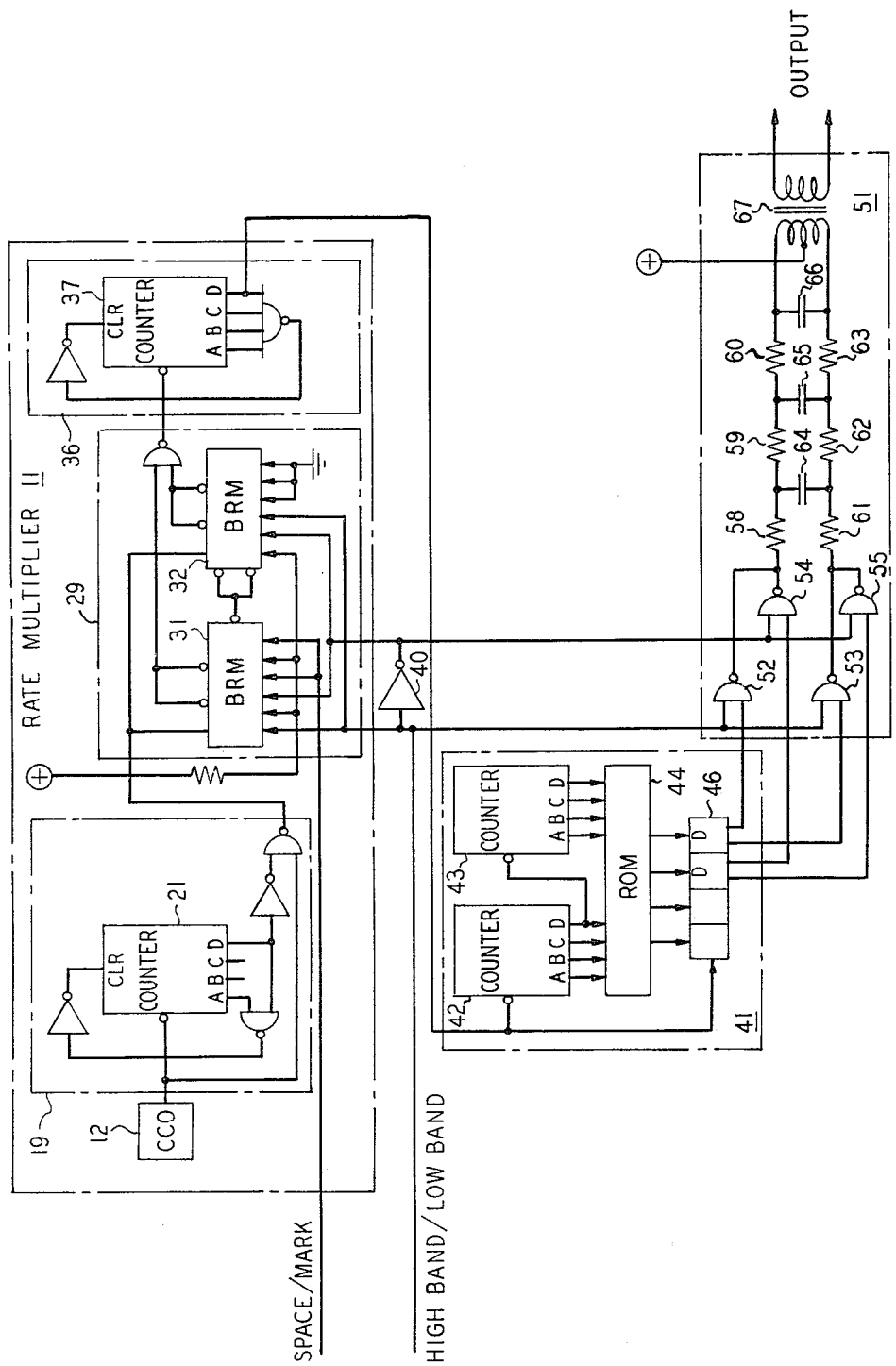
FIG. 1 discloses, in schematic form, an illustrative digital frequency-shift-keyed modulator which embodies the principles of the invention.

FIG. 1 includes three basic components: multiplier 11, lookup table 41 complete with an associated address sequencer, and low-pass filter 51 which includes alternate pairs of gates/buffers. One input to the modulator selects either the high-band or low-band frequencies to provide duplex operational capability. The other input is the "send data" to provide the slight frequency shift used to indicate mark/space signaling for either frequency band. Rate multiplier 11 includes a logic frequency dividing arrangement triggered by the output of crystal controlled oscillator 12 and responsive to the "send data" signal. The output of multiplier 11 drives the address sequencer portion of lookup table 41 which includes ripple counters 42 and 43 which address read-only memory (ROM) 44. The signal from multiplier 11 also clocks D-type flip-flops 46 which strobe the output of ROM 44 when it is stabilized.

In this arrangement, ROM 44 actually has prestored in it two separate bit sequences. One is for the high-band frequency, and the other is for the low-band. Furthermore, the two sequences are concurrently read out. The high-band sequence is selected when gates 52 and 53 of filter 51 are enabled by the presence of a logical "1" level signal at the high-band/low-band input of the modulator. The low-band sequence is selected when gates 54 and 55 are enabled. The presence of a logical "0" level signal at the same input is changed to a logical "1" level by inverter 40 for enabling the low-band gates 54 and 55. Each gate pair is connected to a matched set of complementary outputs from a section of flip-flops 46. The operation of either gate pair provides a balanced driving buffer for the three section lowpass filter ladder network of filter 51.

Gates 52–55 are of the open collector type. Accordingly serially connected resistors 58–60 serve as a tapped load resistor for either gate 52 or 54 while resistors 61–63 serve as the load resistor for either gate 53 or 55. Capacitors 64–66, in this numerical order, complete each of the respective three sections of the ladder network. The center tapped primary of output transformer 67 completes the collector circuit for gates 52–55 while its secondary provides a highly acceptable sinusoidal output that is impedance matched, e.g., 600 ohms, for directly driving standard telephone lines.

Although FIG. 1 illustrates the particular arrangement which was used to provide the rate multiplication sequential addressing of ROM 44, it is to be clearly understood that those skilled in the art may readily provide the same function as rate multiplier 11 with a variety of other arrangements. In addition to crystal controlled oscillator 11, which provides a stable frequency signal, multiplier 11 includes a counting down logic configuration of cascaded stages 19, 29 and 36. In stage 19, counter 21 is a 4-bit (A–D) binary counter with gates arranged to provide an output frequency which is 8/9ths of the input from the oscillator. Intermediate stage 29 comprises two synchronous 6-bit binary rate multipliers, counters 31 and 32, whose division rate is adjusted in accordance with the logic level values of both inputs to the modulator of FIG. 1. Stage 36, the final stage, includes counter 37 which is the same type as counter 21 but has a logical feedback path for dividing its input clocking rate from stage 29 by a factor of 15.

The basic operation of rate multiplier 11 is to provide a clocking rate 256 times the frequency value of the output of the modulator of FIG. 1. A relatively high rate for oscillator 12 was selected at 11.0592 MHz. to minimize the presence of switching noise during transitions. In other words, counters 42–43 of lookup table 41 will cycle once through a full count at a full counting rate commensurate with the frequency of the output of the modulator of FIG. 1. When the modulator of FIG. 1 is in the low-band mode, the binary digit sequence listed in Table I is provided by ROM 44.

TABLE I

| (High-band) | | | |
|---|---|---|---|
| 01010100 | 10100101 | 00100100 | 10001000 |
| 10001000 | 01000001 | 00000100 | 00001000 |
| 00010000 | 00100000 | 10000010 | 00010001 |
| 00010001 | 00100100 | 10100101 | 00101010 |
| 10101011 | 01011010 | 11011011 | 01110111 |
| 01110111 | 10111110 | 11111011 | 11110111 |
| 11101111 | 11011111 | 01111101 | 11101110 |
| 11101110 | 11011011 | 01011010 | 11010101 |

In the high-band mode, ROM 44 provides the binary digit sequence represented by Table II.

TABLE II

| (Low-band) | | | |
|---|---|---|---|
| 11011101 | 11011101 | 11011011 | 10110110 |
| 11011011 | 01011010 | 11010101 | 01010101 |
| 01010100 | 10100101 | 00100100 | 10010010 |
| 00100100 | 01000100 | 01000100 | 01000010 |
| 00100010 | 00100010 | 00100010 | 01001001 |
| 00100100 | 10100101 | 00101010 | 10101010 |
| 10101011 | 01011010 | 11011011 | 01101101 |
| 10111011 | 10111011 | 10111011 | 10111011 |

Tables I and II each contain 256 binary digits. The order of reading the bits in Tables I and II for the proper sequence will be set out. Each line of 8-bits is read from left to right. Then the next lower line is read in the same column. The ordering of the columns is also read from left to right. Reading in this order starting at the first line of the first column will produce the same sequences as are produced by ROM 44 for each full count by counters 42 and 43.

The frequencies of the output signals that are generated from the foregoing sequences are well in the voiceband range of standard telephone lines. For the low-band, the space frequency is 1070 Hertz. The mark frequency for the low-band is 1270 Hertz. A frequency of 2025 Hertz is used for the high-band space signal. Finally, the mark frequency for the high-band is 2225 Hertz. As previously mentioned the mark/space frequency changes are effected by alternating the count down of stage 29 slightly in multiplier 11. On the other hand, the band selection signal produces a shift of the logic level signal applied to inverter 40 produces an opposite shift at its output. Both the input and output signals of inverter 40 are used to control the down counting operation of stage 29 in accordance with the level of the high-band/low-band signal. This function of the band selection signal is in addition to that of enabling one of the gate pairs in filter 51.

Directly from these sequences which are read out of ROM 44 a single bit at a time, the sinusoidal output is obtained by the operation of the three section ladder network of filter 51. The time constants of the sections are the same value which is a multiple of t where t is the duration of one binary digit of the sequence. In particular, the selected time constant was approximately 5t for the high-band sequence and 2.5t for the low-band sequence. This arrangement therefore eliminates the digital-to-analog converter required in prior art modulators. Furthermore, the balanced or push-pull pair of gates provides a high power signal which is able to output directly through the passive low-pass network of filter 51. Another feature of the balanced arrangement is that even ordered harmonic distortion is self-cancelling even though the gates are operated nonlinearly.

One way of understanding that it is possible to obtain a relatively pure sinusoidal signal by direct lowpass filtering of a bit sequence is by thinking in terms of an integrator. In other words at any point in time filter 51 represents an accumulation of digits. Accordingly, for the positive going portions of the sinusoid more "1" level or positive bits are produced by the output of ROM 44 and for negative going portions more "0" level bits are produced. In addition, the chosen bit sequences were selected with the frequency response of filter 51 in mind. Specifically, the bit sequences were slightly modified to reduce the third order harmonic component which will not be attenuated by filter 51 as higher order harmonic components. Finally, the two different bit sequences were selected so that only 0.3 dB amplitude variation occurs at the output of the modulator for the two frequency bands. In other words, selection of the sequence has an effect upon not only the harmonic content of the sinusoidal but also its amplitude.

FIGS. 2, 3 and 4 illustrate the waveforms produced by the operation of the modulator of FIG. 1. FIG. 2 depicts the high-band binary digit sequence produced at the output of the buffer/gates of FIG. 1. The waveform in FIG. 3 illustrates the effect of the first section of filter 51. This waveform actually depicts the voltage potential across capacitor 64. FIG. 4 represents the smooth sinusoidal signal produced by output of transformer 67 by virtue of the operation of the two additional low-pass filtering sections disposed between capacitor 64 and the transformer.

The embodiment of this invention shown in FIG. 1 has been bulit and operated successfully. In this embodiment, counters 21, 37, 42 and 43 are integrated circuit types SN74393; counters 31 and 32 are integrated circuit types SN7497; ROM 44 is a 1024-bit memory of integrated circuit type SN74S287; register 46 is integrated circuit type SN74174; gates 52-55 are integrated circuit type SN7426; and the values of resistors 58-63 are 100 ohms while capacitors 64-66 are 0.1 microfarads. These integrated circuits are available from Texas Instruments, Inc. and are fully described in their TTL Data Handbook, Second Edition, Copyright 1976.

I claim:

1. A modulator for generating frequency shift signals representing binary data signals wherein the carrier portion of the binary data signals is derived from stored binary digits produced in a sequence in response to a pulse train, the modulator is characterized by lookup table means (41) for defining a binary digit sequence having an accumulation representing the amplitudes of a series of points on a theoretical sinusoidal wave, the lookup table means is further arranged to generate each binary digit and its complement in response to the occurrence of each pulse in the pulse train; and output driver means (51) connected to receive the binary digit and their complements from the lookup table means, the output driver means including an output transformer (67) having a center tapped primary, each of the two portions of the primary being driven by one of a first pair of single ended buffers to provide a balanced arrangement (52 and 53) responsive to each binary digit and its complement, and low-pass filtering means (58-66) disposed between each of the two single ended buffers and the primary of the output transformer to provide a sinusoidal wave output at the secondary of the output transformer directly from the binary digit sequence.

2. A modulator in accordance with claim 1 further comprising clocking means having a data terminal connected to receive space/mark signaling, the clocking means producing the pulse train and changing the pulse rate in accordance with the space/mark signaling, and the lookup table means producing the binary digits of the sequence at the same rate as the pulse rate of the clocking means to produce the frequency shifts at the output of the modulator to provide binary data signals representing the space/mark signaling.

3. A modulator in accordance with claim 2 wherein the binary signals are in a first frequency band, the lookup table means is further arranged to generate a second binary digit sequence for a second frequency band concurrently with said first binary digit sequence, and said output driver means includes another pair of single ended buffers connected in a balanced arrangement connected to receive the second binary sequence and both of the pairs of buffers are arranged to work alternately so that the output of the modulator corresponds to either the first or second frequency band to provide duplex capability in the modulator.

4. A modulator in accordance with claim 3 wherein the lookup table means further includes register means for strobing each binary digit output in the binary digit sequence in response to each pulse rate from the clocking means in order to produce each binary digit and its complement when the output of the lookup table means is stabilized.

5. A modulator in accordance with claim 4 wherein the low-pass filter means comprises a plurality of resistive means each having interim taps and a plurality of capacitive means, the resistive means are disposed between each of the single ended buffers and a portion of the tapped primary and the interim taps of one of the resistive means are coupled by the capacitive means to the interim taps of the other resistive means to provide the low-pass filtering function.

6. A modulator in accordance with claim 5 wherein the low-pass filtering means includes three sections each having a time constant whose value is a multiple of the duration of one of the binary digits produced by the lookup table means.

* * * * *